United States Patent
Chen et al.

(10) Patent No.: US 12,524,671 B2
(45) Date of Patent: Jan. 13, 2026

(54) DEEP LEARNING OPTIMIZER FOR FINE-TUNING WHILE DYNAMICALLY MITIGATING CATASTROPHIC FORGETTING

(71) Applicant: GM CRUISE HOLDINGS LLC, San Francisco, CA (US)

(72) Inventors: Zhao Chen, Mountain View, CA (US); Shuai Zheng, Santa Clara, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 584 days.

(21) Appl. No.: 18/159,349

(22) Filed: Jan. 25, 2023

(65) Prior Publication Data
US 2024/0249137 A1    Jul. 25, 2024

(51) Int. Cl.
*G06N 3/08* (2023.01)

(52) U.S. Cl.
CPC ...................... *G06N 3/08* (2013.01)

(58) Field of Classification Search
CPC .......... G06N 3/08; G06N 3/084; G06N 20/00
USPC .................. 706/12, 14, 15, 20, 25
See application file for complete search history.

(56) References Cited

U.S. PATENT DOCUMENTS

| | | | |
|---|---|---|---|
| 2019/0028608 A1* | 1/2019 | Kang | H04N 1/4413 |
| 2021/0019151 A1* | 1/2021 | Pudipeddi | G06N 3/063 |
| 2021/0089040 A1* | 3/2021 | Ebrahimi Afrouzi | G05D 1/0248 |
| 2025/0264307 A1* | 8/2025 | Ebrahimi Afrouzi | H04N 23/56 |

OTHER PUBLICATIONS

Li, Zhizhong et al., "Learning without Forgetting", IEEE, Feb. 2017, 13 pages.
Yu, Tianhe et al., "Gradient Surgery for Multi-Task Learning", Dec. 2020, 27 pages.
Ruder, Sebastian, "An overview of gradient descent optimization algorithms", Jun. 2017, 14 pages.
Farajtabar, Mehrdad et al., "Orthogonal Gradient Descent for Continual Learning", Oct. 2019, 13 pages.
Goodfellow, Ian J., et al., "An Empirical Investigation of Catastrophic Forgetting in Gradient-Based Neural Networks", Mar. 2015, 9 pages.

* cited by examiner

*Primary Examiner* — Md I Uddin
(74) *Attorney, Agent, or Firm* — CANTOR COLBURN LLP

(57) ABSTRACT

Disclosed are embodiments for a deep learning optimizer for fine-tuning while dynamically mitigating catastrophic forgetting. In some aspects, a method includes saving an original state of a model to a buffer, the original state comprising original weights of the model; apply new gradients to intermediate model states of the model during at least one intermediate training step of training of the model; calculate, at a final training step of the training, a displacement vector representing a difference between current weights of the model and the original weights of the model; responsive to the displacement vector and a final gradient of the final training step being inconsistent in terms of gradient direction, perform an orthogonal projection of the final gradient on the displacement vector to generate an orthogonal gradient; and applying the orthogonal gradient to the original state of the model at the final training step of the training.

12 Claims, 9 Drawing Sheets

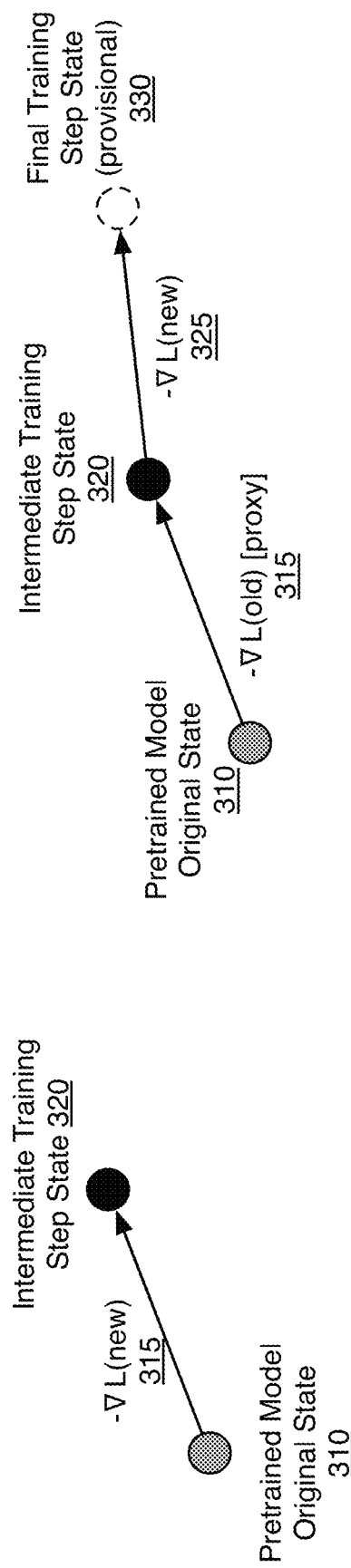

400

Save original model state to buffer, where the original model state includes original weights of the model prior to training
410

For each training step 1 through N-1 of N training steps of the model, calculate a new gradient for the training step and apply the new gradient to the model using a reference learning rate
420

Calculate a displacement vector of weight values using a most recent set of weights of the model after the N-1 training step and the original weights of the model stored in the buffer
430

Calculate a new gradient for training step N
440

Responsive to the displacement vector and the new gradient being inconsistent in terms of gradient direction, calculate an orthogonal gradient comprising an orthogonal projection of the new gradient for training step N on the displacement vector
450

Restore the model to the original model state using the original weights stored in the buffer
460

Apply the orthogonal gradient to the restored model at training step N using a main learning rate
470

Identify (1) a new gradient for a training step N of a machine learning algorithm that is training a model and (2) a displacement vector representing how far the model has moved from an original set of weights at a first training step of the training to a most recent set of weights at training step N of the training
510

Compute a dot product of the new gradient and the displacement vector
520

Is the dot product a negative value?
530

YES → Calculate updated gradient as an orthogonal projection of the new gradient onto the displacement vector
540

NO → Set updated gradient equal to the new gradient
550

Apply the updated gradient to a restored version of the original model at training step N of the training
560

*FIG. 5*

DEEP LEARNING OPTIMIZER FOR FINE-TUNING WHILE DYNAMICALLY MITIGATING CATASTROPHIC FORGETTING

BACKGROUND

1. Technical Field

The disclosure generally relates to the field of processing systems and, more specifically, to a deep learning optimizer for fine-tuning while dynamically mitigating catastrophic forgetting.

2. Introduction

Autonomous vehicles, also known as self-driving cars, driverless vehicles, and robotic vehicles, may be vehicles that use multiple sensors to sense the environment and move without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

The various advantages and features of the disclosed technology will become apparent by reference to specific implementations illustrated in the appended drawings. A person of ordinary skill in the art will understand that these drawings show some examples of the disclosed technology and would not limit the scope of the disclosed technology to these examples. Furthermore, the skilled artisan will appreciate the principles of the disclosed technology as described and explained with additional specificity and detail through the use of the accompanying drawings in which:

FIGS. 3A-3D illustrate state diagrams depicting various states of a model during a training phase applying a dynamic learning without forgetting (DLWF) optimizer, in accordance with embodiments herein;

FIG. 4 illustrates an example method implementing a deep learning optimizer for fine-tuning while dynamically mitigating catastrophic forgetting, in accordance with embodiments herein;

FIG. 5 illustrates an example method for applying an updated gradient using a DLWF approach, in accordance with embodiments herein;

DETAILED DESCRIPTION

Figure 1:
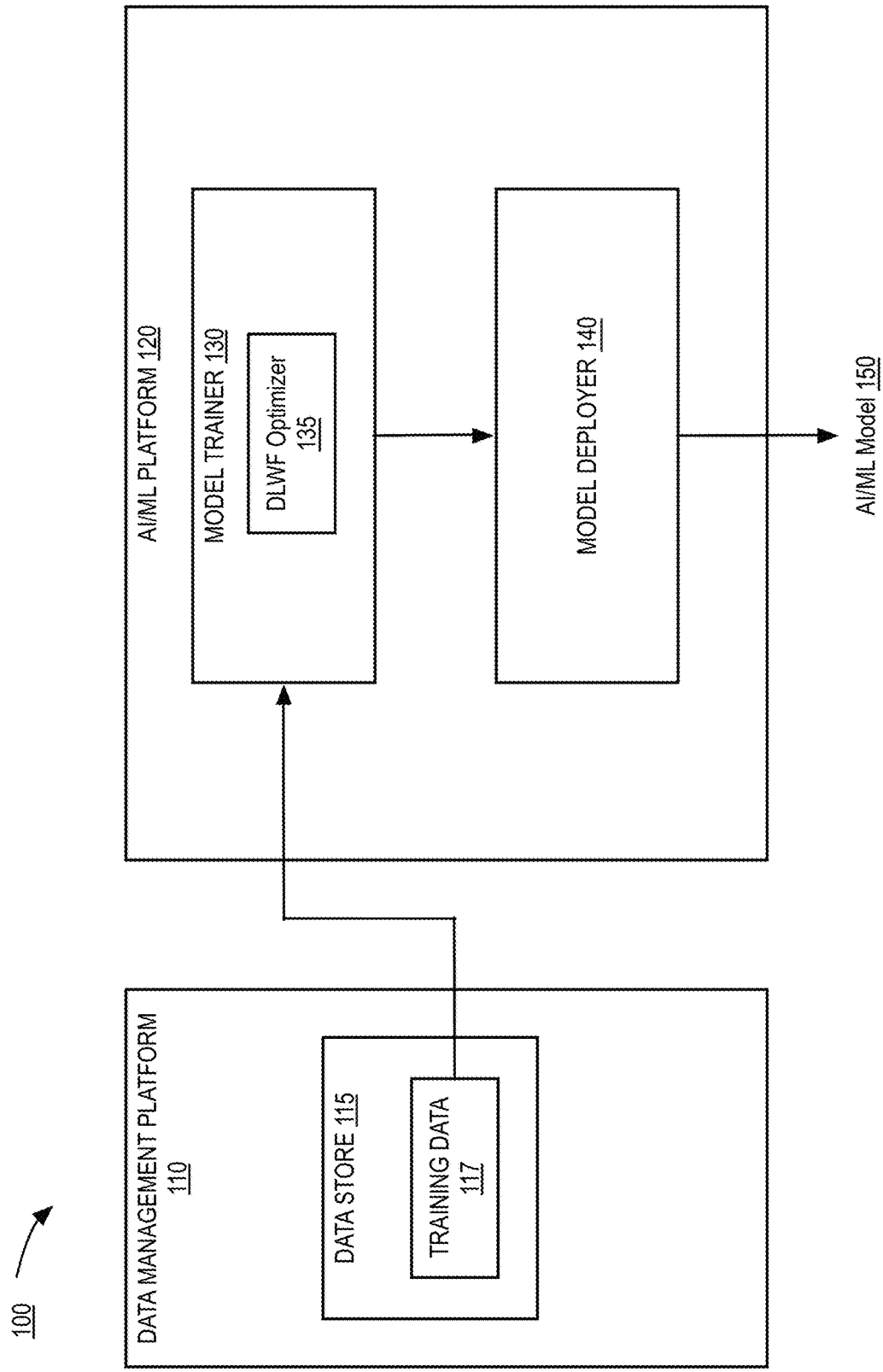
FIG. 1 is a block diagram of an example model training system illustrating utilization of a deep learning optimizer for fine-tuning while dynamically mitigating catastrophic forgetting, in accordance with embodiments herein.

The detailed description set forth below is intended as a description of various configurations of the subject technology and is not intended to represent the configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Autonomous vehicles (AVs), also known as self-driving cars, driverless vehicles, and robotic vehicles, can be implemented by companies to provide self-driving car services for the public, such as taxi or ride-hailing (e.g., ridesharing) services. The AV can navigate about roadways without a human driver based upon sensor signals output by sensor systems deployed on the AV. AVs may utilize multiple sensors to sense the environment and move without a human driver. An example AV can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

AVs can utilize one or more trained machine learning (ML)-based models that autonomously control and/or operate the vehicle. The trained model(s) can utilize the data and measurements captured by the sensors of the AV to identify, classify, and/or track objects (e.g., vehicles, people, stationary objects, structures, animals, etc.) within the AV's environment. The model(s) utilized by the AV may be trained using any of various suitable types of learning, such as deep learning (also known as deep structured learning). Deep learning is part of a broader family of machine learning methods based on artificial neural networks with representation learning. The learning can be supervised, semi-supervised, or unsupervised, and may be trained using real-world image data and/or image data generated in a simulated environment that have been labeled according to "correct" outputs of one or more perception functions (e.g., segmentation, classification, and/or tracking) of the AV.

Neural networks, such as those utilized in deep learning, are achieving state of the art and sometimes super-human performance on learning tasks across a variety of domains. Whenever these tasks utilize learning in a continual or sequential manner, however, neural networks can suffer from the problem of catastrophic forgetting (also known as catastrophic interference). Catastrophic forgetting occurs when the neural network forgets how to solve a previous task after being trained on a new task, despite having the capacity to solve both tasks if the neural network was trained on both simultaneously. In other words, catastrophic forgetting refers to a tendency of an artificial neural network to forget previously-learned information upon learning new information. Catastrophic forgetting can be problematic in the field of autonomous driving, for example, when myriad tasks are to be performed by the same network and data is changing. The compute, memory, and storage overheads of continuing to train multitask models from scratch with all of the data quickly becomes an untenable policy.

One approach for mitigating catastrophic forgetting is called learning without forgetting (LWF). In LWF, a copy of an original or previous network's weights are kept, and subsequently utilized to generate training targets for new incoming training data. While LWF is advantageous, it is also subject to some potential issues including arbitrary weight balance scaling, unresolved conflicts between tasks, and being undynamic, for example.

With respect to arbitrary weight balance scaling in LWF, there is an additional hyperparameter of the relative weights within the loss function corresponding to the new tasks and to the old task. For example, when this relative task balance is tuned, it can result in different performance for different weight settings. For example, when a second task is added to model training, it is not clear whether that second task is assumed to have the same weight as the first added task or of all the original tasks. This problem is compounded when additional tasks are added further in the future.

With respect to unresolved conflicts between tasks in LWF, if the old task loss function and the new task loss function are in direct conflict with each other, then adding the gradient signals between these two tasks can theoretically be ill-advised, as the sum gradient direction may in fact decrease the old task performance. Because the old data is no longer available to train the old tasks at this time, preventing such a decrease in performance should be prioritized.

With respect to LWF being undynamic, LWF tabulates imperfect targets once, at the beginning of training. Because these targets are not actual ground truth, keeping them around as oracle even as the network trains and its internal state changes seems suboptimal. Instead, it would be beneficial to be able to dynamically change the target even as the network trains.

Embodiments herein address the above-described technical problems and challenges by providing a deep learning optimizer for fine-tuning while dynamically mitigating catastrophic forgetting. Optimizers are algorithms or methods used to change the attributes of a neural network, such as weights and learning rate in order to reduce the losses. The deep learning optimizer can work both for new tasks and/or adding new data, or in some cases, even in absentia of new tasks or data (e.g., fine-tuning a model). In embodiments herein, the deep learning optimizer implements dynamic learning without forgetting (DLWF), which utilizes gradients to dynamically ensure consistency at each step of training. With DLWF, during training of a model, the new gradient signals coming from a new task are made to be compatible (e.g., consistent) with the previous gradient signals that maintain an original state (e.g., weights) of the model. In some embodiments, orthogonal projection techniques may be utilized by the deep learning optimizer to provide compatibility (and/or consistency) between gradient signals during training. In DLWF, the model may be restored to its original state (pre-training weights) and an orthogonalized gradient may be applied to the original model state. This allows for continuing to learn a new task (or apply new data to an old task, fine-tune a model, etc.), while continuously restoring the original model state that performed well on the old task (old data, etc.).

The DLWF optimizer of embodiments herein addresses the above-described disadvantages of the LWF methodology that were discussed above. For example, the DLWF optimizer can avoid the arbitrary loss balancing as the DLWF optimizer step operates on gradient directions. Furthermore, the DLWF optimizer explicitly removes gradient conflicts by using an orthogonal projection. In addition, the DLWF optimizer is dynamic as it deals with the neural network model in its current state.

Although some embodiments herein are described as operating in an AV, other embodiments may be implemented in an environment that is not an AV, such as, for example, other types of vehicles (human operated, driver-assisted vehicles, etc.), air and terrestrial traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, altimetry and flight control systems, guided missile target locating systems, ground-penetrating radar for geological observations, and so on. Furthermore, other embodiments may be more generally implemented in any artificial intelligence and/or machine learning-type environment. The following description discussed embodiments as implemented in an automotive environment, but one skilled in the art will appreciate that embodiments may be implemented in a variety of different environments and use cases. Further details of the deep learning optimizer for fine-tuning while dynamically mitigating catastrophic forgetting of embodiments herein are further described below with respect to FIGS. 1-8.

FIG. 1 is a block diagram of an example model training system 100 illustrating utilization of a deep learning optimizer for fine-tuning while dynamically mitigating catastrophic forgetting, in accordance with embodiments herein. In one embodiment, model training system 100 implements a deep learning optimizer for fine-tuning while dynamically mitigating catastrophic forgetting, as described further herein. The model training system 100 of FIG. 1 can be, for example, part of a data center that is cloud-based or otherwise. In other examples, the model training system 100 can be part of an AV or a human-operated vehicle having an advanced driver assistance system (ADAS) that can utilize various sensors including radar sensors.

In one embodiment, model training system 100 can communicate over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In one embodiment, model training system 100 can be implemented using a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth.

The model training system 100 may be part of a data center for managing a fleet of AVs and AV-related services. The data center can send and receive various signals to and from an AV. These signals can include sensor data captured by the sensor systems of the AV, roadside assistance requests, software updates, ridesharing pick-up and drop-off instructions, and so forth. In some examples, the model training system 100 may be hosted in a data center that may also support a ridesharing service, a delivery service, a remote/roadside assistance service, street services (e.g., street mapping, street patrol, street cleaning, street metering, parking reservation, etc.), and the like. In some embodiments, the model training system 100 may be implemented in the AV itself or may be implemented in a server computing device.

In this example, the model training system 100 includes one or more of a data management platform 110 and an Artificial Intelligence/Machine Learning (AI/ML) platform 120, among other systems.

Data management platform 110 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. In one embodiment, the data management platform includes a data store 115 that stores training data 117 collected, for example, from operation of one or more AVs. In some embodiments, training data 117 may be a training data set provided from any source.

The AI/ML platform 120 can provide an infrastructure for training and evaluating machine learning algorithms for operating the AV, for example, as well as other platforms and systems. In one embodiment, the AI/ML platform 120 of model training system 100 may include a model trainer 130 and a model deployer 140. Using the model trainer 130 and/or the model deployer 140, data scientists can prepare data sets from the data management platform 110; select, design, and train machine learning models 150; evaluate, refine, and deploy the models 150; maintain, monitor, and retrain the models 150; and so on. In some embodiments, the AI/ML platform 120 implements deep learning techniques (also more generally referred to herein as "deep learning").

Deep learning uses artificial neural networks to perform sophisticated computations on large amounts of data. It is a type of machine learning that works based on the structure and function of the human brain. Deep learning algorithms train machines by learning from examples. While deep learning algorithms feature self-learning representations, they depend upon artificial neural networks that mirror the way the brain computes information. During the training process, algorithms use unknown elements in the input distribution to extract features, group objects, and discover useful data patterns. Much like training machines for self-learning, this occurs at multiple levels, using the algorithms to build the models. Deep learning models may make use of several algorithms, such as (but not limited to) Convolutional Neural Networks (CNNs), Long Short Term Memory Networks (LSTMs), Recurrent Neural Networks (RNNs), Generative Adversarial Network (GANs), Radial Basis Function Networks (RBFNs), Multilayer Perceptrons (MLPs), Self Organizing Maps (SOMs), Deep Belief Networks (DBNs), Restricted Boltzmann Machines (RBMs), and/or Autoencoders, to name a few examples.

In embodiments herein, the model trainer 130 can implement an optimizer that is used to train one or more machine learning models, such as one or more of an object detection model, an image classification model, a video classification model, an object tracking model, and/or a trajectory prediction model, for example, utilized by an AV, using deep learning techniques. Optimizers are algorithms or methods used to change the attributes of a neural network, such as the neural network's weights and learning rate, in order to reduce the overall losses of the neural network and improve accuracy of the neural network. In one embodiment, the optimizer is a DLWF optimizer 135 for fine-tuning while dynamically mitigating catastrophic forgetting in a deep learning environment.

In embodiments herein, the DLWF optimizer 135 may operate on model weights to mitigate catastrophic forgetting of the model during training. The DLWF optimizer 135 can work both for new tasks and/or adding new data, or in some cases, even in absentia of new tasks or data (e.g., fine-tuning a model). The DLWF optimizer 135 utilizes gradients to dynamically ensure consistency at each step of training. At each step of training of a model, the DLWF optimizer 135 causes new gradient signals coming from a current training step (e.g., a new task) to be compatible (e.g., consistent) with previous gradient signals associated with an original state (e.g., an old task) of the model. In some embodiments, orthogonal projection techniques may be utilized by the DLWF optimizer 135 to provide compatibility (and/or consistency) between gradient signals during training. The DLWF optimizer 135 can further restore the model to its original state (pre-training weights) and apply an orthogonalized gradient to the original model state. This allows for continuing to learn a new task (or apply new data to an old task, fine-tune a model, etc.), while continuously restoring the original model state that performed well on the old task (old data, etc.).

Figure 2:
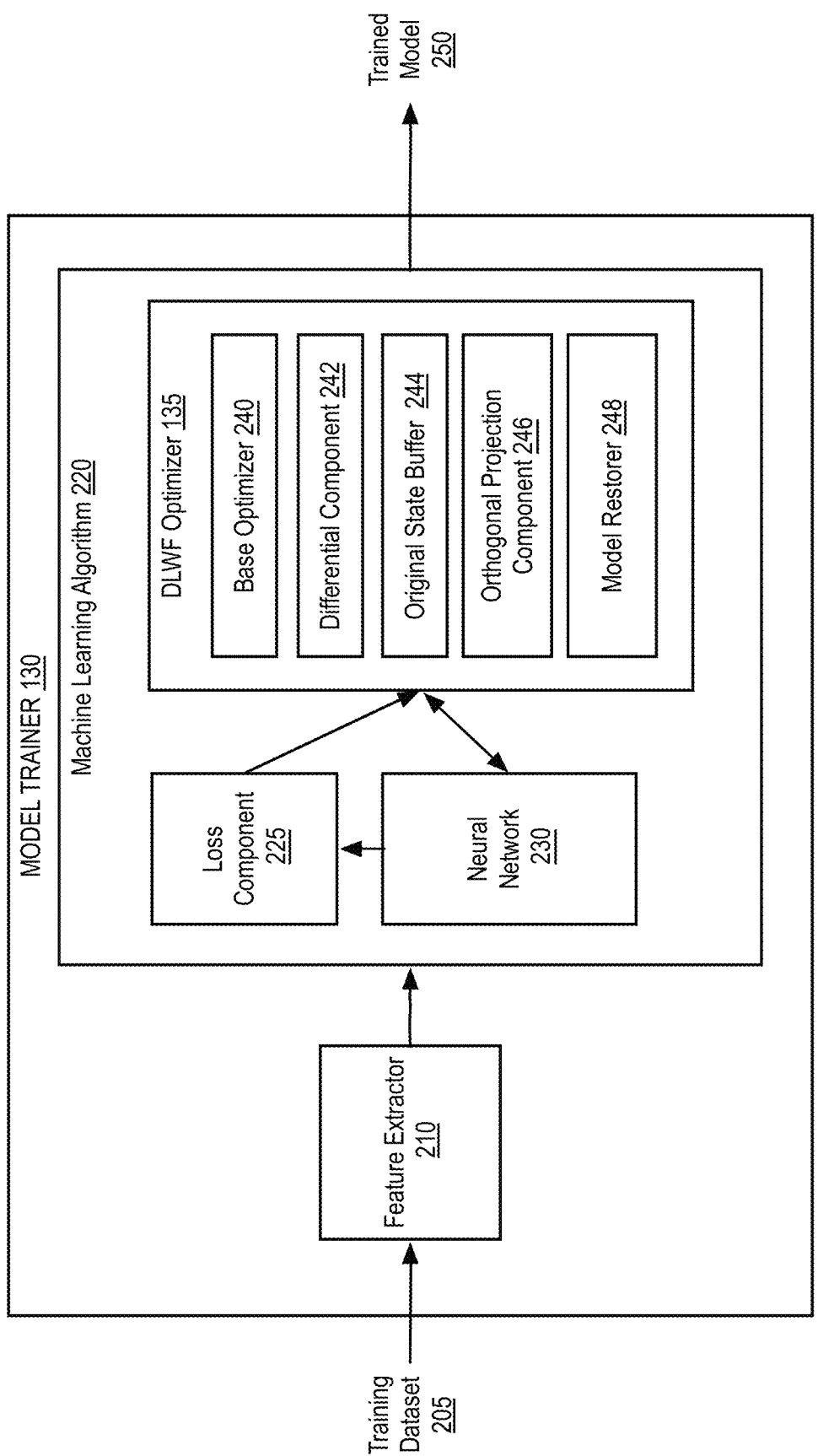
FIG. 2 is a block diagram of a detailed view of an example model trainer providing a deep learning optimizer for fine-tuning while dynamically mitigating catastrophic forgetting, in accordance with embodiments herein.

FIG. 2 is a block diagram of a detailed view of an example model trainer, such as model trainer 130, providing a deep learning optimizer for fine-tuning while dynamically mitigating catastrophic forgetting, in accordance with embodiments herein. In one embodiment, model trainer 130 is the same as model trainer 130 described with respect to FIG. 1. In one embodiment, model trainer 130 implements DLWF techniques as described herein.

Model trainer 130 may receive a training dataset 205. In one embodiment, training dataset 205 may be scene data collected by one or more AVs during operation. The training dataset 205 may include both training input data and corresponding labeled data. The training dataset 205 is passed to the feature extractor 210 of model trainer 130. Feature extractor 210 transforms the larger dataset of training dataset 205 into a reduced set of features (also referred to as a feature vector) by performing feature selection. Feature selection determines a subset of the initial features from the input data, where the subset of initial features is expected to contain relevant information. This allows the training to be performed using the reduced representation (of the initial features) instead of the complete training dataset 205.

The extracted features are then passed to a machine learning algorithm 220 of the model trainer 130. During a training process provided by model trainer 130, the machine learning algorithm 220 uses unknown elements in the input distribution of the subset of initial features provided by feature extractor 210 to extract features, group objects, and discover useful patterns. This can occur at multiple levels using machine learning algorithm 220 to build the model provided by neural network 230. As previously noted, machine learning algorithm 220 may utilize one of several algorithms (e.g., CNNs, RNNs, GANS, etc.) implementing deep learning techniques using neural network 230.

In one embodiment, neural network 230 is an artificial neural networking including artificial neurons, referred to as nodes. The nodes of the neural network 230 are stacked next to one another in layers. The layers may include an input layer, hidden layer(s), and an output layer. Data provides each node with information in the form of inputs. The node multiplies the inputs with random weights (learnable parameters in a model that control the signal between two neurons), calculates them, and adds a bias. Finally, nonlinear functions, also known as activation functions, are applied to determine which neuron to fire.

In embodiments herein, machine learning algorithm 220 utilizes a loss component 225 and a DLWF optimizer 135 to train a deep learning model of neural network 230 as trained model 250. The loss component 225 may implement a loss function (also referred to as a cost function) that is used to calculate a cost that is a difference between a predicted value (generated by the neural network 230 from input data (e.g., subset of initial features of training dataset)) and an actual value (e.g., labeled data from the training set). The loss function may measure the inconsistency between a predicted value and an actual value/target value. Based on a metric implementing the loss function at loss component 225, the loss function can process a batch of inputs to compute an overall output loss. The loss function can be implemented using any known type of loss function such as Mean Squared Error (MSE) (or quadratic) loss function; a Mean Squared Logarithmic Error (MSLE) loss function; a Mean Absolute Error (MAE) loss function; a Mean Absolute Percentage Error (MAPE) loss function; a Kullback Leibler (KL) Divergence loss function; a Cross Entropy or Multi-Class Cross Entropy loss function; a Negative Log Likelihood loss function; a Cosine Proximity loss function; a Hinge loss or max margin objective loss function; and so on, to name some examples.

In embodiments herein, the DLWF optimizer 135 may be utilized to make changes to the weights and learning rate (a parameter that provides the model the scale of how much model weights should be updated) of the neural network 230 during training. As previously noted, an optimizer is a function or algorithm that modifies the attributes of the neural network 230 to help reduce the overall loss provided by loss function of loss component 225 and improve the accuracy of the neural network. There are various optimization algorithms for training neural networks, such as neural network 230. How the weights and/or learning rates of the neural network 230 are modified to reduce the losses of the neural network 230 are defined by the particular optimizer that is utilized.

One optimization algorithm used by an optimizer is gradient descent. Gradient descent is used heavily in linear regression and classification algorithms. Backpropagation in neural networks also uses gradient descent algorithms. Gradient descent is a first-order optimization algorithm that is dependent on the first order derivative of a loss function. It calculates which way the weight should be altered so that the loss function can reach a minimum. Another optimization algorithm used by an optimizer is stochastic gradient descent, which is a variant of gradient descent. Stochastic gradient descent can be regarded as a stochastic approximation of gradient descent optimization, since it replaces the actual gradient (calculated from the complete data set) by an estimate thereof (calculated from a randomly selected subset of the data). Various other optimization algorithms are also possible to be implemented by an optimizer.

The DLWF optimizer 135 provided herein may include a base optimizer 240, differential component 242, original state buffer 244, orthogonal projection component 246, and a model restorer 248. In embodiments herein, the DLWF optimizer 135 utilizes the base optimizer 240 to calculate gradients. In one embodiment, the base optimizer 240 may be a gradient descent optimizer or a stochastic gradient descent optimizer, for example.

Using the gradients calculated by the base optimizer 240, the DLWF optimizer 135 can dynamically ensure consistency between current and past (e.g., gradients to return to an original state of the model represented by neural network 230) at each step of training performed by the machine learning algorithm 220. The DLWF optimizer 135 aims to enable recovery of an original state task prediction of the model, while performing additional gradient updates during training. It is known that restoring the state of the model also restores the performance on an original (old) task. However, the training should seek to move the model somewhere and not just keep it pinned to a single state. To accomplish this, the DLWF optimizer 135 initially saves the "original" state (initial state, old state, etc.) of the model in the original state buffer 244. The state of the model may refer to the current weights of the model. In this case, the original state of the model may be pretrained weights of the model prior to training.

Figures 3C, 3D:
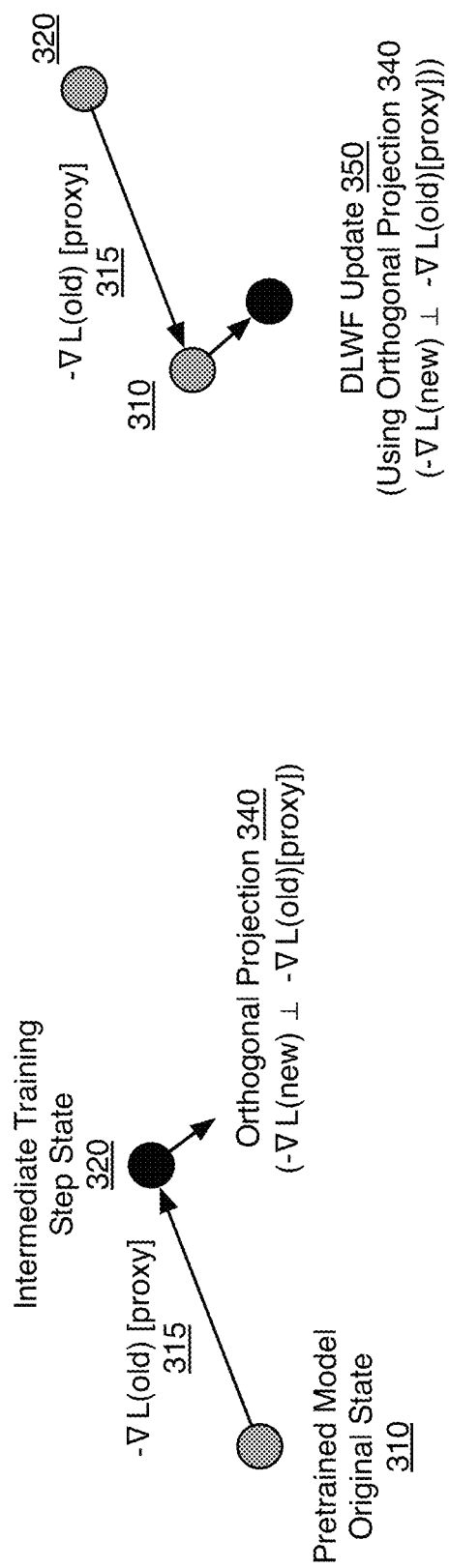

The DLWF optimizer 135 can then use the base optimizer 240 to perform a series of normal gradient updates for a new task (or for new data on a same task, fine-tuning, etc.) (At a reference learning rate). FIGS. 3A-3D illustrate state diagrams depicting various states of a model during a training phase applying a DLWF optimizer, in accordance with embodiments herein. FIG. 3A illustrates a state diagram depicting an intermediate state change of a model during training from an original state 310 of the pretrained model to an intermediate training step state 320 of the model resulting from applying an intermediate training step of training by the model trainer (e.g., model trainer 130). In embodiments herein, the intermediate training step may refer to any of training steps 1 through N−1, for N training steps of the model. A new gradient 315 (−∇L(new)) calculated for this intermediate training step is shown on the edge between the pretrained model original state 310 and the intermediate training step state 320.

FIG. 3B illustrates a state diagram depicting a provisional final state change of the model when a final training step is applied to the model during training. Provisional here refers to calculating the gradient used to arrive at the weights of the final training step state 330, but not yet applying the gradient to the model. Although a single intermediate training step state 320 and final training step state 330 are illustrated in FIG. 3B, there may be additional intermediate training steps that are performed between the original state and final training step that result in additional intermediate training step states (not shown). In this case, the intermediate training step would refer to the N−1 training step. A provisional final training step state 330 of the model is identified and an updated new gradient 325 ((−∇L(new)) for the edge between the intermediate training step state 320 and the provisional final training step state 330 is shown. The gradient for the edge between the pretrained model original state 310 and the intermediate training step state 320 is considered the "old" gradient and is shown as −∇L(old) [proxy] 315 in FIG. 3B.

Referring back to FIG. 2, the DLWF optimizer 135 then utilizes the differential component 242 to identify a displacement vector representing the gradient used to restore the model back to the original state (e.g., pretrained model original state 310 of FIG. 3B). In one embodiment, the gradient used to restore the model back to the original state is the −∇L(old) [proxy] 315 described with respect to FIG. 3B. The differential component 242 may calculate the displacement vector by obtaining the original state of the model stored in the original state buffer 244 and subtracting the weights of the model identified at the current training step from the original state. This displacement vector indicates how far the model has moved from the original state.

The DLWF optimizer 135 may then cause the displacement vector and the next gradient update for the training to be "consistent" (or compatible) with each other in terms of gradient direction. In one embodiment, the DLWF optimizer 135 may determine "consistency" by calculating a dot product of the new (final) gradient update with the displacement vector. If this dot product is nonnegative (e.g., 0 or positive), then the displacement vector and the new gradient update are considered to be consistent with one another and the new gradient update can be applied to a restored version of model by the DLWF optimizer 135. The model restorer 248 may access the original state of the model from original state buffer 244 and cause the weights of the original state to be applied to the model, prior to applying the new gradient update to the model.

On the other hand, if the dot product is negative, then the displacement vector and the new gradient update are considered to be inconsistent (incompatible) with one another. In this case, the DLWF optimizer 135 utilizes orthogonal projection component 246 to enforce nonnegativity by taking an orthogonal projection of the displacement vector and the new gradient update. In one embodiment, a Gram-Schmidt orthogonalization process may be utilized to orthogonalize the set of vectors. In some embodiments, the orthogonal projection utilizes explicit asymmetry by projecting the new gradient onto the displacement vector (representing the original model state), but does not project the displacement vector onto the new gradient. This allows for maintaining the original model state information during the training updates.

The orthogonalized vector is then applied to the original state of the model by the DLWF optimizer 135. The model restorer 248 may access the original state of the model from the original state buffer 244 and cause the weights of the original state to be applied to the model. Then, the orthogonalized vector is applied to the original state of the model (at a main learning rate). In this way, DLWF optimizer 135 allows for continuing to learn a new task (or apply new data to an old task, or fine-tune a model, etc.), while continuously restoring the "original" state that performed well on the old task (or old data, etc.).

In some embodiments, different learning rates may be utilized when applying the gradients at the intermediate steps of the training versus applying the orthogonalized vector to the original restored state of the model at the final step. In some embodiments, the different learning rates may be referred to as a reference learning rate and a main learning rate.

FIGS. 3C and 3D illustrate state diagrams depicting an orthogonal projection as applied during training of a model by a DLWF optimizer, in accordance with embodiments herein. In FIG. 3C, the orthogonal projection 340 of the updated new gradient 325 from FIG. 3B ((−∇L(new)) on the proxy "old" gradient corresponding to the pretrained model original state 310 is shown. As shown in FIG. 3C, this orthogonal projection is calculated using the model state from the intermediate training step state 320 (that the updated new gradient is calculated from) as well as the displacement vector. The orthogonal projection is represented as "−∇L(new)⊥−∇L(old) [proxy]". At FIG. 3D, the model is restored to the pretrained model original state 310 and the DLWF update 350 is applied to the model using the orthogonal projection 340 calculated at FIG. 3C. In one embodiment, FIG. 3D illustrates the utilization of the orthogonal projection 340 in the case where the displacement vector and the new gradient update are considered to be inconsistent (incompatible) with one another.

In one embodiment, the process of DLWF optimizer 135 may be represented by the pseudo-steps of a training process, detailed as follows:

FOR STEP 1 OF TRAINING:
    (1) Save buffer $b=W_i$, where $W_t$ corresponds to the weights of the model before the $t^{th}$ training step.
    (2) Calculate gradients $\nabla L_{new}$ and apply those gradients using a standard NN optimizer at learning rate $lr_{ref}$.

FOR STEP 2 . . . N−1 OF TRAINING:
    (1) Calculate gradients $\nabla L_{new}$ and apply those gradients using a standard NN optimizer at learning rate $lr_{ref}$.

FOR STEP N OF TRAINING
    (1) Calculate the displacement vector $d=b-W_n$, which tells us how far we've moved from the buffered weight values.
    (2) Calculate gradients $\nabla L_{new}$.
    (3) If $<-\nabla L, d>$ is less than zero 0, then set $g = -\nabla L - <-\nabla L, d> d/\|d\|^2$ (Gram Schmidt). Otherwise, set $g=-\nabla L_{new}$.
    (4) Set $W_n=b$.
    (5) Make the update to $W_n$ in the direction of gradient g and a standard NN optimizer at learning rate $lr_{main}$.

One skilled in the art will appreciate that the above pseudo-steps are not meant to be limiting to embodiments discussed herein and that other methodologies for the DLWF optimizer may be implemented in embodiments herein. For example, in one embodiment, the consistency determination and orthogonal projection may be performed at one or more intermediate training steps of the model, instead of at a final training step.

The DLWF optimizer of embodiments herein addresses the above-described disadvantages of the LWF methodology that were discussed above. For example, the DLWF optimizer can avoid arbitrary loss balancing as the DLWF optimizer step operates on gradient directions. Furthermore, the DLWF optimizer explicitly removes gradient conflicts by using an orthogonal projection. In addition, the DLWF optimizer is dynamic as it deals with the neural network model in its current state. Lastly, the DLWF optimizer can correctly deal with input domain shifts reflected in new datasets used to train a model.

FIG. 4 illustrates an example method 400 implementing a deep learning optimizer for fine-tuning while dynamically mitigating catastrophic forgetting, in accordance with embodiments herein. Although the example method 400 depicts a particular sequence of operations, the sequence may be altered without departing from the scope of the disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where an original model state is saved to a buffer. In one embodiment, the original model state includes original weights of the model prior to training. Then, at block 420, for each training step 1 through N−1 of N training steps of the model, a new gradient is calculated for the respective training step and the new gradient is applied to the model using a reference learning rate.

Subsequently, at block 430, a displacement vector of weight values is calculated using a most recent set of weights of the model after the N−1 training step and the original weights of the model stored in the buffer. At block 440, a new gradient for training step N is calculated. Then, at block 450, responsive to the displacement vector and the new gradient being inconsistent in terms of gradient direction, an orthogonal gradient is calculated. In one embodiment, the orthogonal gradient includes an orthogonal projection of the new gradient for training step N on the displacement vector. In one embodiment, consistency between the displacement vector and the new gradient is determined by calculating a dot product of the displacement vector and the new gradient. When the dot product is negative, the two vectors are considered inconsistent in terms of gradient direction. When the dot product is nonnegative, the two vectors are considered consistent in terms of gradient direction.

At block 460, the model is restored to the original model state using the original weights stored in the buffer. Lastly, at block 470, the orthogonal gradient is applied to the restored model at training step N using a main learning rate. In some embodiments, when the displacement vector and the new gradient are consistent with each other, the new gradient is applied to the restored model (instead of using the orthogonal gradient).

FIG. 5 illustrates an example method 500 for applying an updated gradient using a DLWF approach, in accordance with embodiments herein. Although the example method 500 depicts a particular sequence of operations, the sequence may be altered without departing from the scope of the disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where the example device or system identifies (1) a new gradient for a training step N of a machine learning algorithm that is training a model and (2) a displacement vector representing how far the model has moved from an original set of weights at a first training step of the training to a most recent set of weights at training step N of the training. Then, at block 520, a dot product of the new gradient and the displacement vector is computed.

Subsequently, at decision block 530, it is determined whether the dot product is a negative value. If so, then method 500 proceeds to block 540, where an updated gradient is calculated as an orthogonal projection of the new gradient onto the displacement vector. On the other hand, if it is determined that the dot product is a nonnegative value at decision block 530, the method 500 proceeds to block 550 where the updated gradient is set to be equal to the new gradient. Lastly, both of blocks 540 and 550 proceed to block 560, where the updated gradient is applied to a restored version of the original model at training step N of the training.

Figure 6:
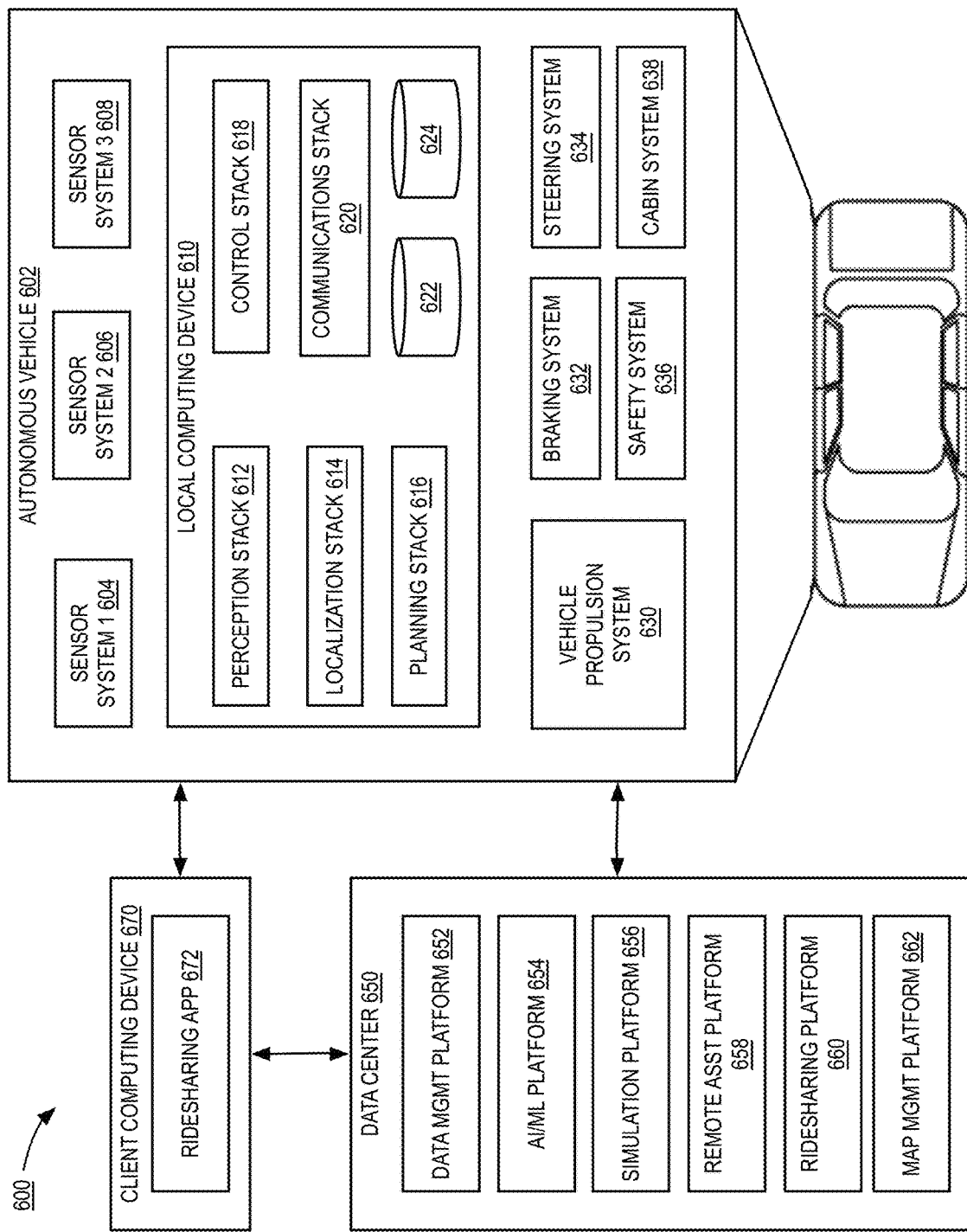
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. In one embodiment, the AV management system 600 can implement a deep learning optimizer for fine-tuning while dynamically mitigating catastrophic forgetting, as described further herein. One of ordinary skill in the art will understand that, for the AV management system 600 and any system discussed in the disclosure, there can be additional or fewer components in similar or alternative configurations. The illustrations and examples provided in the disclosure are for conciseness and clarity. Other embodiments may include different numbers and/or types of elements, but one of ordinary skill the art will appreciate that such variations do not depart from the scope of the disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 7 and elsewhere in the disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
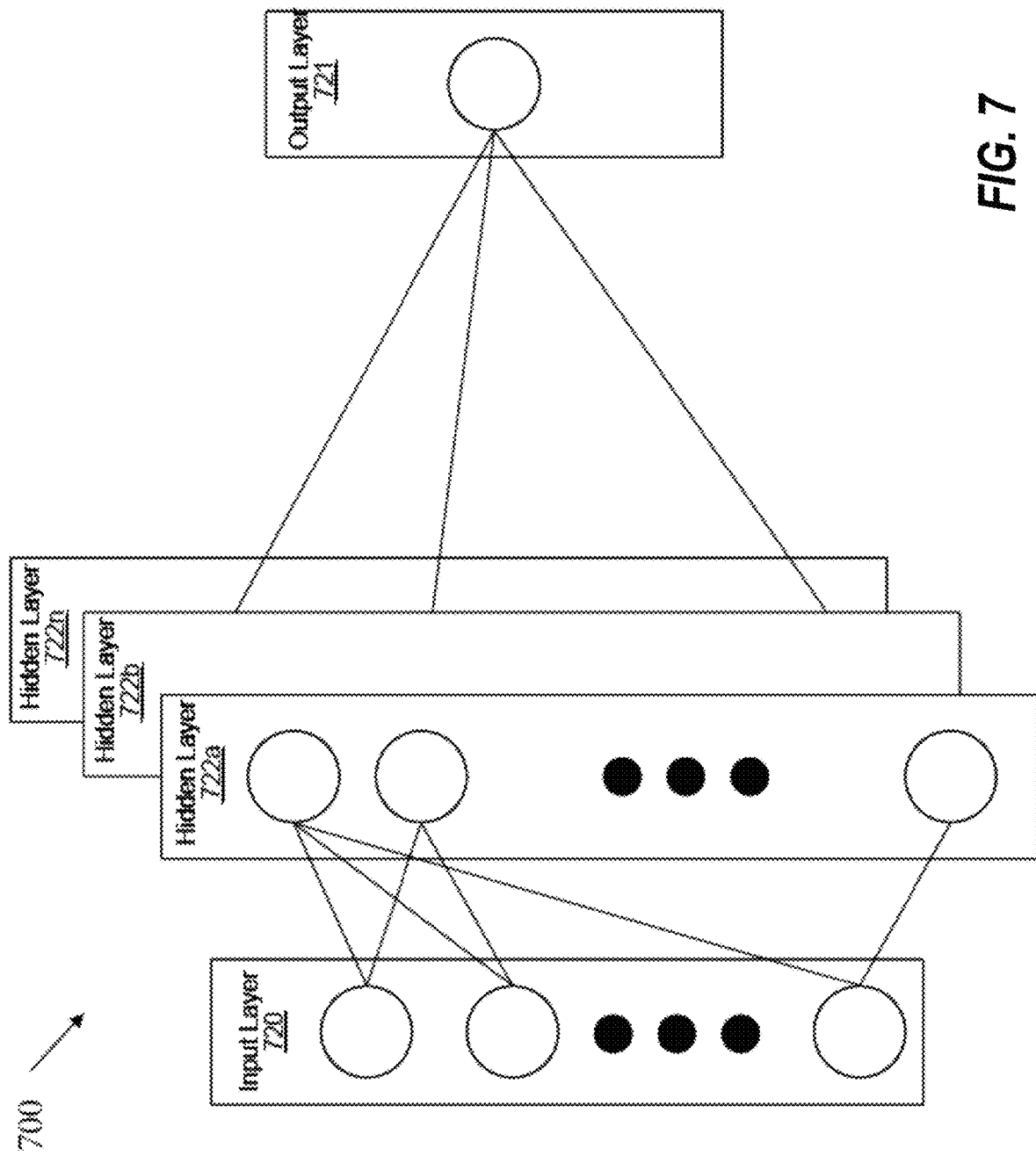
FIG. 7 illustrates an example of a deep learning neural network that can be used to implement a perception module and/or one or more validation modules, according to some aspects of the disclosed technology.

In FIG. 7, the disclosure now turns to a further discussion of models that can be used through the environments and techniques described herein. Specifically, FIG. 7 is an illustrative example of a deep learning neural network 700 that can be used to implement all or a portion of a perception module (or perception system) as discussed above. An input layer 720 can be configured to receive sensor data and/or data relating to an environment surrounding an AV. The neural network 700 includes multiple hidden layers 722a, 722b, through 722n. The hidden layers 722a, 722b, through 722n include "n" number of hidden layers, where "n" is an integer greater than or equal to one. The number of hidden layers can be made to include many layers for the given application. The neural network 700 further includes an output layer 721 that provides an output resulting from the processing performed by the hidden layers 722a, 722b, through 722n. In one illustrative example, the output layer 721 can provide estimated treatment parameters that can be used/ingested by a differential simulator to estimate a patient treatment outcome.

The neural network 700 is a multi-layer neural network of interconnected nodes. Each node can represent a piece of information. Information associated with the nodes is shared among the different layers and each layer retains information as information is processed. In some cases, the neural network 700 can include a feed-forward network, in which case there are no feedback connections where outputs of the network are fed back into itself. In some cases, the neural network 700 can include a recurrent neural network, which can have loops that allow information to be carried across nodes while reading in input.

Information can be exchanged between nodes through node-to-node interconnections between the various layers. Nodes of the input layer 720 can activate a set of nodes in the first hidden layer 722a. For example, as shown, each of the input nodes of the input layer 720 is connected to each of the nodes of the first hidden layer 722a. The nodes of the first hidden layer 722a can transform the information of each input node by applying activation functions to the input node information. The information derived from the transformation can then be passed to and can activate the nodes of the next hidden layer 722b, which can perform their own designated functions. Example functions include convolutional, up-sampling, data transformation, and/or any other suitable functions. The output of the hidden layer 722b can then activate nodes of the next hidden layer, and so on. The output of the last hidden layer 722n can activate one or more nodes of the output layer 721, at which an output is provided. In some cases, while nodes in the neural network 700 are shown as having multiple output lines, a node can have a single output and all lines shown as being output from a node represent the same output value.

In some cases, each node or interconnection between nodes can have a weight that is a set of parameters derived from the training of the neural network 700. Once the neural network 700 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 700 to be adaptive to inputs and able to learn as more and more data is processed.

The neural network 700 is pre-trained to process the features from the data in the input layer 720 using the different hidden layers 722a, 722b, through 722n in order to provide the output through the output layer 721.

In some cases, the neural network 700 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 700 is trained well enough so that the weights of the layers are accurately tuned.

To perform training, a loss function can be used to analyze errors in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 700 can perform a backward pass by determining which inputs (weights) most contributed to the loss of the network, and can adjust the weights so that the loss decreases and is eventually minimized.

The neural network 700 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for down sampling), and fully connected layers. The neural network 700 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc. Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 8:
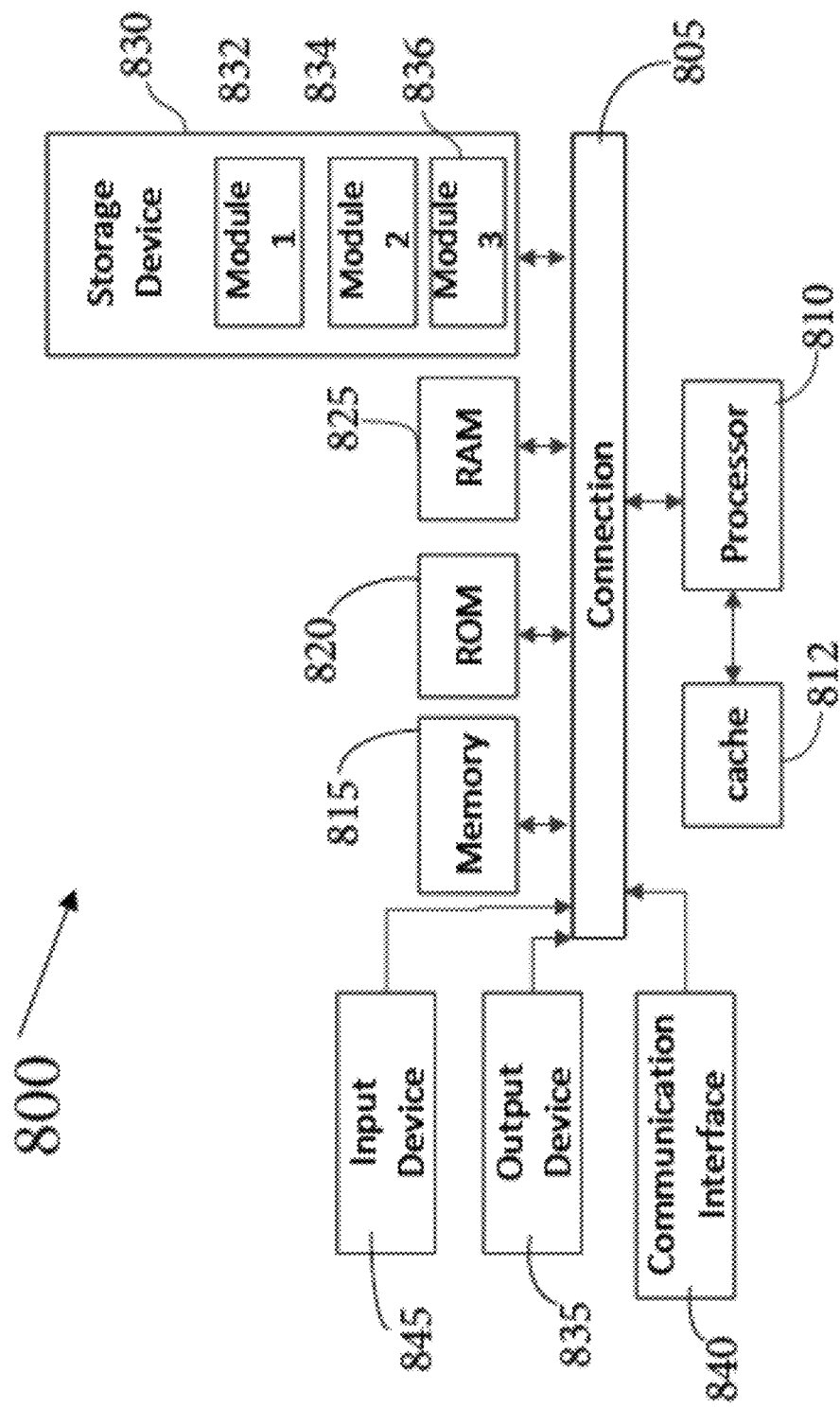
FIG. 8 illustrates an example processor-based system with which some aspects of the subject technology can be implemented.

FIG. 8 illustrates an example processor-based system with which some aspects of the subject technology can be implemented. For example, processor-based system 800 can be any computing device making up, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (Central Processing Unit (CPU) or processor) 810 and connection 805 that couples various system components including system memory 815, such as Read-Only Memory (ROM) 820 and Random-Access Memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800.

Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 830 can include software services, servers, services, etc., that when the code that defines such software is executed by the processor 810, it causes the system 800 to perform a function. In some embodiments, a hardware service that performs a particular function can include the software component stored in a computer-readable medium in connection with hardware components, such as processor 810, connection 805, output device 835, etc., to carry out the function.

Embodiments within the scope of the disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a method for facilitating a deep learning optimizer for fine-tuning while dynamically mitigating catastrophic forgetting, where the method comprising saving, by a processing device that is to perform training on a model, an original state of the model to a buffer, the original state comprising original weights of the model prior to the training; applying, during at least one intermediate training step of the training, new gradients to intermediate model states of the model at the at least one intermediate training step; calculating, at a final training step of the training, a displacement vector representing a difference between current weights of the model at the final training step and the original weights of the model saved in the buffer; responsive to the displacement vector and a final gradient of the final training step being inconsistent in terms of gradient direction, performing an orthogonal projection of the final gradient on the displacement vector to generate an orthogonal gradient; and applying the orthogonal gradient to the original state of the model at the final training step of the training.

In Example 2, the subject matter of Example 1 can optionally include wherein the model comprises a machine learning model for an autonomous vehicle (AV). In Example 3, the subject matter of any one of Examples 1-2 can optionally include wherein the machine learning model is at least one of an object detection model, an image classification model, a video classification model, an object tracking model, or a trajectory prediction model. In Example 4, the subject matter of any one of Examples 1-3 can optionally include wherein responsive to the displacement vector and the final gradient being consistent in terms of gradient direction, applying the final gradient to the original state of the model at the final training step of training.

In Example 5, the subject matter of any one of Examples 1-4 can optionally include further comprising restoring the model to the original state using the original weights stored in the buffer. In Example 6, the subject matter of any one of Examples 1-5 can optionally include further comprising determining whether the displacement vector and the final gradient are consistent with one another by calculating a dot product of the displacement vector and the final gradient. In Example 7, the subject matter of any one of Examples 1-6 can optionally include wherein the displacement vector and the final gradient are inconsistent in response to the dot product being negative.

In Example 8, the subject matter of any one of Examples 1-7 can optionally include wherein the displacement vector and the final gradient are consistent in response to the dot product being nonnegative. In Example 9, the subject matter of any one of Examples 1-8 can optionally include wherein the orthogonal projection comprises a Gram-Schmidt orthogonalization process. In Example 10, the subject matter of any one of Examples 1-9 can optionally include wherein the new gradients are applied at a reference learning rate, and wherein the orthogonal gradient is applied at a main learning rate.

Example 11 includes an apparatus for a deep learning optimizer for fine-tuning while dynamically mitigating catastrophic forgetting, the apparatus of Example 11 comprising one or more hardware processors to: save an original state of a model to a buffer, the original state comprising original weights of the model prior to training of the model; apply, during at least one intermediate training step of the training, new gradients to intermediate model states of the model at the at least one intermediate training step; calculate, at a final training step of the training, a displacement vector representing a difference between current weights of the model at the final training step and the original weights of the model saved in the buffer; responsive to the displacement vector and a final gradient of the final training step being inconsistent in terms of gradient direction, perform an orthogonal projection of the final gradient on the displacement vector to generate an orthogonal gradient; and apply the orthogonal gradient to the original state of the model at the final training step of the training.

In Example 12, the subject matter of Example 11 can optionally include wherein the model comprises a machine learning model for an autonomous vehicle (AV). In Example 13, the subject matter of Examples 11-12 can optionally include wherein responsive to the displacement vector and the final gradient being consistent in terms of gradient direction, applying the final gradient to the original state of the model at the final training step of training.

In Example 14, the subject matter of Examples 11-13 can optionally include wherein the one or more hardware processors are further to determine whether the displacement vector and the final gradient are consistent with one another by calculating a dot product of the displacement vector and the final gradient, wherein the displacement vector and the final gradient are inconsistent in response to the dot product being negative, and wherein the displacement vector and the final gradient are consistent in response to the dot product being nonnegative. In Example 15, the subject matter of Examples 11-14 can optionally include wherein the new gradients are applied at a reference learning rate, and wherein the orthogonal gradient is applied at a main learning rate.

Example 16 is a non-transitory computer-readable storage medium for facilitating a deep learning optimizer for fine-tuning while dynamically mitigating catastrophic forgetting. The non-transitory computer-readable storage medium of Example 16 having stored thereon executable computer program instructions that, when executed by one or more processors, cause the one or more processors to: save an original state of a model to a buffer, the original state comprising original weights of the model prior to training of the model; apply, during at least one intermediate training step of the training, new gradients to intermediate model states of the model at the at least one intermediate training step; calculate, at a final training step of the training, a displacement vector representing a difference between current weights of the model at the final training step and the original weights of the model saved in the buffer; responsive to the displacement vector and a final gradient of the final training step being inconsistent in terms of gradient direction, perform an orthogonal projection of the final gradient on the displacement vector to generate an orthogonal gradient; and apply the orthogonal gradient to the original state of the model at the final training step of the training.

In Example 17, the subject matter of Example 16 can optionally include wherein the model comprises a machine learning model for an autonomous vehicle (AV). In Example 18, the subject matter of Examples 16-17 can optionally include wherein responsive to the displacement vector and the final gradient being consistent in terms of gradient direction, applying the final gradient to the original state of the model at the final training step of training.

In Example 19, the subject matter of Examples 16-18 can optionally include wherein the one or more processors further to determine whether the displacement vector and the final gradient are consistent with one another by calculating a dot product of the displacement vector and the final gradient, wherein the displacement vector and the final gradient are inconsistent in response to the dot product being negative, and wherein the displacement vector and the final gradient are consistent in response to the dot product being nonnegative. In Example 20, the subject matter of Examples 16-19 can optionally include wherein the new gradients are applied at a reference learning rate, and wherein the orthogonal gradient is applied at a main learning rate.

Example 21 is a system for facilitating a deep learning optimizer for fine-tuning while dynamically mitigating catastrophic forgetting. The system of Example 21 can optionally include a memory to store a block of data, and one or more hardware processors communicably coupled to the memory, wherein the one or more hardware processors are to: save an original state of a model to a buffer, the original state comprising original weights of the model prior to training of the model; apply, during at least one intermediate training step of the training, new gradients to intermediate model states of the model at the at least one intermediate training step; calculate, at a final training step of the training, a displacement vector representing a difference between current weights of the model at the final training step and the original weights of the model saved in the buffer; responsive to the displacement vector and a final gradient of the final training step being inconsistent in terms of gradient direction, perform an orthogonal projection of the final gradient on the displacement vector to generate an orthogonal gradient; and apply the orthogonal gradient to the original state of the model at the final training step of the training.

In Example 22, the subject matter of Example 21 can optionally include wherein the model comprises a machine learning model for an autonomous vehicle (AV). In Example 23, the subject matter of Examples 21-22 can optionally include wherein responsive to the displacement vector and the final gradient being consistent in terms of gradient direction, applying the final gradient to the original state of the model at the final training step of training.

In Example 24, the subject matter of Examples 21-23 can optionally include wherein the one or more hardware processors are further to determine whether the displacement vector and the final gradient are consistent with one another by calculating a dot product of the displacement vector and the final gradient, wherein the displacement vector and the final gradient are inconsistent in response to the dot product being negative, and wherein the displacement vector and the final gradient are consistent in response to the dot product being nonnegative. In Example 25, the subject matter of Examples 21-24 can optionally include wherein the new gradients are applied at a reference learning rate, and wherein the orthogonal gradient is applied at a main learning rate.

Example 26 includes an apparatus comprising means for performing the method of any of the Examples 1-10. Example 27 is at least one machine readable medium comprising a plurality of instructions that in response to being executed on a computing device, cause the computing device to carry out a method according to any one of Examples 1-10. Example 28 is an apparatus for facilitating a deep learning optimizer for fine-tuning while dynamically mitigating catastrophic forgetting, configured to perform the method of any one of Examples 1-10. Specifics in the Examples may be used anywhere in one or more embodiments.

The various embodiments described above are provided by way of illustration and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
a deep learning optimizer for fine-tuning while dynamically mitigating catastrophic forgetting, configured to perform:
providing, from sensors, data and measurements to an internal computing system of a autonomous vehicle, which use the data and measurements to control a mechanical system of the autonomous vehicle;
saving, by a processing device that is to perform training on a model, an original state of the model to a buffer, the original state comprising original weights of the model prior to the training;
applying, during at least one intermediate training step of the training, new gradients to intermediate model states of the model at the at least one intermediate training step;
calculating, at a final training step of the training, a displacement vector representing a difference between current weights of the model at the final training step and the original weights of the model saved in the buffer;
responsive to the displacement vector and a final gradient of the final training step being inconsistent in terms of gradient direction, performing an orthogonal projection of the final gradient on the displacement vector to generate an orthogonal gradient;
determine whether the displacement vector and the final gradient are consistent with one another by calculating a dot product of the displacement vector and the final gradient, wherein the displacement vector and the final gradient are inconsistent in response to the dot product being negative, and wherein the displacement vector and the final gradient are consistent in response to the dot product being nonnegative;
restoring the model to the original state using the original weights stored in the buffer; and
applying the orthogonal gradient to the original state of the model at the final training step of the training, wherein the new gradients are applied at a reference learning rate, and wherein the orthogonal gradient is applied at a main learning rate.

2. The method of claim 1, wherein the model comprises a machine learning model for the autonomous vehicle (AV).

3. The method of claim 2, wherein the machine learning model is at least one of an object detection model, an image classification model, a video classification model, an object tracking model, or a trajectory prediction model.

4. The method of claim 1, wherein responsive to the displacement vector and the final gradient being consistent in terms of gradient direction, applying the final gradient to the original state of the model at the final training step of training.

5. The method of claim 1, further comprising determining whether the displacement vector and the final gradient are consistent with one another by calculating a dot product of the displacement vector and the final gradient.

6. The method of claim 1, wherein the orthogonal projection comprises a Gram-Schmidt orthogonalization process.

7. An apparatus comprising:
one or more hardware processors to:
a deep learning optimizer for fine-tuning while dynamically mitigating catastrophic forgetting, configured to perform:
providing, from sensors, data and measurements to an internal computing system of a autonomous vehicle, which use the data and measurements to control a mechanical system of the autonomous vehicle;
save an original state of a model to a buffer, the original state comprising original weights of the model prior to training of the model;
apply, during at least one intermediate training step of the training, new gradients to intermediate model states of the model at the at least one intermediate training step;
calculate, at a final training step of the training, a displacement vector representing a difference between current weights of the model at the final training step and the original weights of the model saved in the buffer;
responsive to the displacement vector and a final gradient of the final training step being inconsistent in terms of gradient direction, perform an orthogonal projection of the final gradient on the displacement vector to generate an orthogonal gradient;
determine whether the displacement vector and the final gradient are consistent with one another by calculating a dot product of the displacement vector and the final gradient, wherein the displacement vector and the final gradient are inconsistent in response to the dot product being negative, and wherein the displacement vector and the final gradient are consistent in response to the dot product being nonnegative;
restoring the model to the original state using the original weights stored in the buffer; and
apply the orthogonal gradient to the original state of the model at the final training step of the training, wherein the new gradients are applied at a reference learning rate, and wherein the orthogonal gradient is applied at a main learning rate.

8. The apparatus of claim 7, wherein the model comprises a machine learning model for the autonomous vehicle (AV).

9. The apparatus of claim 7, wherein responsive to the displacement vector and the final gradient being consistent in terms of gradient direction, applying the final gradient to the original state of the model at the final training step of training.

10. A non-transitory computer-readable medium having stored thereon instructions that, when executed by one or more processors, cause the one or more processors to:
a deep learning optimizer for fine-tuning while dynamically mitigating catastrophic forgetting, configured to perform:
providing, from sensors, data and measurements to an internal computing system of a autonomous vehicle, which use the data and measurements to control a mechanical system of the autonomous vehicle;
save an original state of a model to a buffer, the original state comprising original weights of the model prior to training of the model;
apply, during at least one intermediate training step of the training, new gradients to intermediate model states of the model at the at least one intermediate training step;
calculate, at a final training step of the training, a displacement vector representing a difference between current weights of the model at the final training step and the original weights of the model saved in the buffer;

responsive to the displacement vector and a final gradient of the final training step being inconsistent in terms of gradient direction, perform an orthogonal projection of the final gradient on the displacement vector to generate an orthogonal gradient;

determine whether the displacement vector and the final gradient are consistent with one another by calculating a dot product of the displacement vector and the final gradient, wherein the displacement vector and the final gradient are inconsistent in response to the dot product being negative, and wherein the displacement vector and the final gradient are consistent in response to the dot product being nonnegative;

restoring the model to the original state using the original weights stored in the buffer; and apply the orthogonal gradient to the original state of the model at the final training step of the training, wherein the new gradients are applied at a reference learning rate, and wherein the orthogonal gradient is applied at a main learning rate.

11. The non-transitory computer-readable medium of claim 10, wherein the model comprises a machine learning model for the autonomous vehicle (AV).

12. The non-transitory computer-readable medium of claim 10, wherein responsive to the displacement vector and the final gradient being consistent in terms of gradient direction, applying the final gradient to the original state of the model at the final training step of training.

\* \* \* \* \*